R. W. STEWART.
FINGER-NAIL CUTTER.
No. 190,989. Patented May 22, 1877.
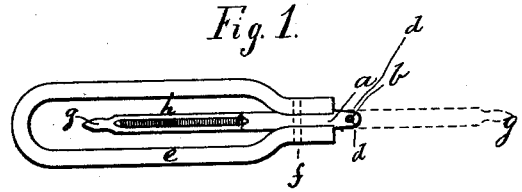
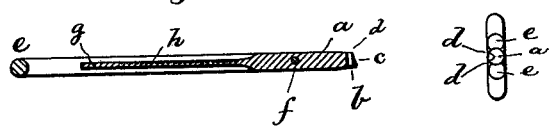 
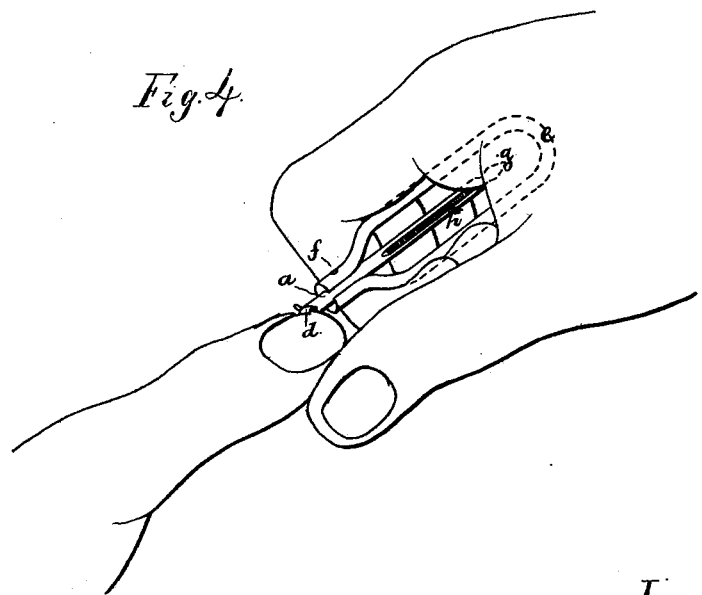
Witnesses:
Henry Chadbourn.
F. Allen.
Inventor:
Richard W. Stewart.
by
Alban Andrew.
his atty.

UNITED STATES PATENT OFFICE.

RICHARD W. STEWART, OF BOSTON, MASSACHUSETTS.

IMPROVEMENT IN FINGER-NAIL CUTTERS.

Specification forming part of Letters Patent No. 190,989, dated May 22, 1877; application filed February 10, 1877.

*To all whom it may concern:*

Be it known that I, RICHARD W. STEWART, of Boston, in the county of Suffolk and State of Massachusetts, have invented certain new and useful Improvements in Finger-Nail Cutters and Cleaners; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to improvements in finger-nail cutters and cleaners; and consists of a metallic rod or wire, through which is made transversely a perforation near the end of said rod, which end is ground and beveled obliquely to the center line of the rod, by which sharp cutting-edges are formed on one side of the rod at the intersection with the transverse perforation aforesaid, which latter also serves both for the exit of the portion of the finger-nail that is cut off as well as a guide for preventing cutting off too much of the nail at one cut.

This my improved finger-nail cutter may be secured to any suitable handle or fixed like a hinged knife-blade to an ordinary pocket-knife without departing from the spirit of my invention.

The rear of the metallic rod may be extended as a finger-nail cleaner, and made with a serrated surface for filing the nails after they are cut in the ordinary way.

The metallic bar is preferably hinged to a spring-wire handle, that serves both as a holder and protector for the cleaner when the tool is carried in the vest-pocket or otherwise.

On the drawings, Figure 1 represents a side elevation of my invention. Fig. 2 represents an end view of the same. Fig. 3 represents a longitudinal section, and Fig. 4 represents a perspective view of the same, showing the manner of holding and operating the cutter.

Similar letters refer to similar parts wherever they occur on the different parts of the drawings.

$a$ represents the metallic bar, having a perforation, $b$, made transversely through it near one of its ends, and having its extreme end $c$ beveled and ground oblique, as shown, and terminating on one side at the junction with the perforation $b$, by which the sharp cutting-edges $d\ d$ are formed. $e$ represents a spring-wire handle and protector, to which the rod $a$ is preferably hinged at $f$, as shown. The rear end of the bar $a$ is extended as a cleaner, $g$, and furthermore provided with the serrated surface $h$, serving as a file in the ordinary way.

The dotted lines in Fig. 1 show the position of the cleaner and file in relation to the handle when they are required for use.

The inner portions of the free ends of the spring-wire handle $e$ are made concave, as shown in Fig. 2, so as to hold the bar $a$ in its proper position in relation to the said handle $e$, whether the cutter or cleaner is to be used.

Fig. 4 represents the manner of using my improved finger-nail cutter. This is done, as represented, by holding the tool in one hand, the thumb of which is held on one side of the finger on which the nail is to be cut. The operation is performed by inserting the edge of the nail between the V-shaped cutting-edges $d\ d$, and then gradually moving the cutter transversely over the edge of the nail, when the cut-off portion thereof passes through the perforation $b$ in a manner as shown in Fig. 4.

With very little practice the tool can be used by any one with ease and quickness. When the cutting-edges become dull, they can easily be re-sharpened by drawing the extreme beveled end of the bar $a$ over an ordinary oil-stone or suitable sharpener.

Having thus fully described the nature, construction, and operation of my invention, I wish to secure by Letters Patent and claim—

1. A nail-cutter, consisting of the metallic rod $a$, with its perforation $b$, beveled end $c$, and cutting-edges d d, as set forth and described.

2. The combination, with the metallic rod a, perforation b, end c, and cutting-edges d d, of the cleaner g and file h, as and for the purpose set forth.

3. In combination, the hinged cutter-bar a b c d d, the cleaner g h, and the spring-wire handle e, as set forth.

In testimony that I claim the foregoing as my own invention I have affixed my signature in presence of two witnesses.

RICHARD W. STEWART.

Witnesses:
ALBAN ANDRÉN,
CHAS. H. WATSON.